US012748732B2

(12) United States Patent
Uretzky et al.

(10) Patent No.: US 12,748,732 B2
(45) Date of Patent: Sep. 29, 2026

(54) REDUCTION OF JOURNAL LOG IN A STORAGE SYSTEM

(71) Applicant: HEWLETT PACKARD ENTERPRISE DEVELOPMENT LP, Spring, TX (US)

(72) Inventors: Omer Uretzky, Herzliya (IL); Gil Barash, Herzliya (IL); Maya Leshem, Herzliya (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/413,419

(22) Filed: Jan. 16, 2024

(65) Prior Publication Data

US 2025/0231919 A1 Jul. 17, 2025

(51) Int. Cl.
*G06F 16/18* (2019.01)
*G06F 16/17* (2019.01)

(52) U.S. Cl.
CPC ...... *G06F 16/1815* (2019.01); *G06F 16/1734* (2019.01); *G06F 16/1873* (2019.01)

(58) Field of Classification Search
CPC ............. G06F 16/1815; G06F 16/1734; G06F 16/1873
See application file for complete search history.

(56) References Cited

U.S. PATENT DOCUMENTS

| | | | | |
|---|---|---|---|---|
| 11,733,874 | B2 * | 8/2023 | Matosevich | G06F 3/0608 711/165 |
| 11,782,842 | B1 * | 10/2023 | Sabo | G06F 12/0868 711/113 |
| 2017/0139781 | A1 * | 5/2017 | Camp | G06F 3/065 |
| 2020/0379915 | A1 * | 12/2020 | Moertl | G06F 3/0626 |
| 2021/0311631 | A1 * | 10/2021 | Knauft | G06F 3/0689 |
| 2022/0083515 | A1 * | 3/2022 | Yoon | G06F 16/156 |
| 2022/0206715 | A1 * | 6/2022 | Kim | G06F 3/0656 |
| 2024/0232020 | A1 * | 7/2024 | Shveidel | G06F 16/1844 |

OTHER PUBLICATIONS

Zerto, "Zerto-Platform-Architecture-Guide", 2022, 13 Pages.
Bill Jannen, "Log-Structured File System (LFS)," CSCI 333 : Storage Systems, Spring 2021, accessed Aug. 2, 2023, <http://cs.williams.edu/~jannen/teaching/s21/cs333/meetings/LFS.html>.

(Continued)

*Primary Examiner* — Cindy Nguyen
(74) *Attorney, Agent, or Firm* — Trop, Pruner & Hu, P.C.

(57) ABSTRACT

Example implementations relate to data storage. An example includes detecting a trigger event for a reduction operation of a journal log, and in response selecting a set of target segments in the journal log. The example also includes determining a set of storage locations that were modified by write operations recorded in the set of target segments, and identifying a subset of journal entries in the set of target segments, where each journal entry of the subset of journal entries records a most recent write operation recorded for a different storage location of the set of storage locations. The example also includes generating a new segment including the identified subset of journal entries, and replacing the set of target segments with the generated new segment.

20 Claims, 11 Drawing Sheets

(56) References Cited

OTHER PUBLICATIONS

Dominix et al., "Is there a filesystem that keep track of all filesystem modification without snapshot? [duplicate]," May 19, 2019, accessed Aug. 2, 2023.
Jim Handy, "How Controllers Maximize SSD Life—External Data Buffering," Sep. 28, 2012, <https://thessdguy.com/how-controllers-maximize-ssd-life-external-data-buffering/#more-628>.
NILFS Community, "Manuals—nilfs-clean(8)," updated Apr. 2014, accessed Aug. 2, 2023, <https://nilfs.sourceforge.io/en/man8/nilfs-clean.8.html>.
NILFS Community, "Manuals—nilfs_cleanerd(8)," updated Apr. 2014, accessed Aug. 2, 2023, <https://nilfs.sourceforge.io/en/man8/nilfs_cleanerd.8.html>.
NILFS Community, "Manuals—nilfs_cleanerd. conf(5)," updated Apr. 2014, accessed Aug. 2, 2023, <https://nilfs.sourceforge.io/en/man5/nilfs_cleanerd.conf.5.html>.
NILFS Community, "What is NILFS?," accessed Aug. 2, 2023, <https://nilfs.sourceforge.io/en/about_nilfs.html>.
The kernel development community, "NILFS2—The Linux Kernel documentation," accessed Aug. 2, 2023, <https://docs.kernel.org/filesystems/nilfs2.html>.
The NILFS Development Team and NTT Laboratories, "NILFS—A New Implementation of a Log-structured File System for Linux," README, accessed Aug. 2, 2023, < https://github.com/nilfs-dev/nilfs2-module#readme>.
Wikipedia, "Log-structured File System (BSD)," Jul. 15, 2022, <https://en.wikipedia.org/w/index.php?title=Log-structured_File_System_(BSD)&oldid=1098268887>.
Wikipedia, "Log-structured file system," Apr. 23, 2023, <https://en.wikipedia.org/w/index.php?title=Log-structured_file_system&oldid=1151398064>.
Wikipedia, "NILFS," Feb. 3, 2023, <https://en.wikipedia.org/w/index.php?title=NILFS&oldid=1137211510.
Zerto, "Zerto Solution Architecture Guide Backup, Disaster Recovery, and Data Mobility," 2022, accessed Aug. 2, 2023, <https://www.zerto.com/wp-content/uploads/2021/07/Zerto-Platform-Architecture-Guide.pdf>.

* cited by examiner

REDUCTION OF JOURNAL LOG IN A STORAGE SYSTEM

BACKGROUND

Computing devices may include components such as a processor, memory, caching system, and storage device. The storage device may include a hard disk drive that uses a magnetic medium to store and retrieve data blocks. Some storage systems may transfer data between different locations or devices. For example, some systems may transfer and store copies of important data for archival and recovery purposes.

BRIEF DESCRIPTION OF THE DRAWINGS

Some implementations are described with respect to the following figures.

Figure 1:
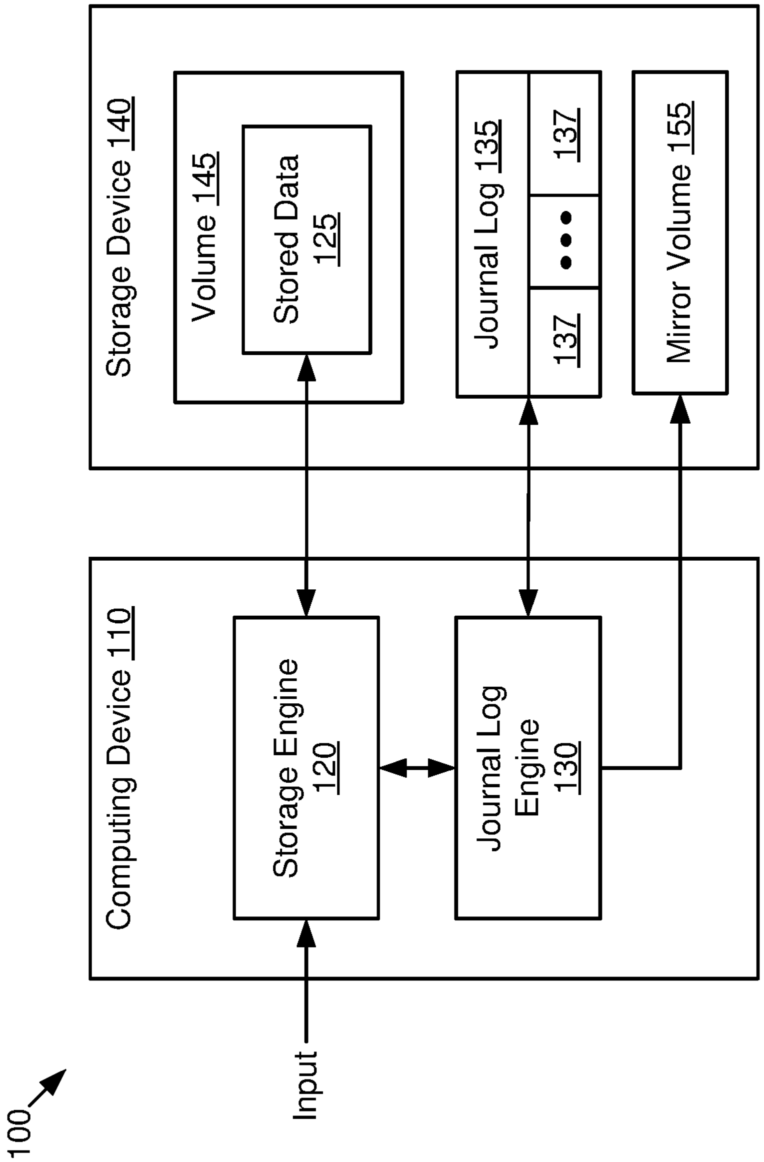
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a computing system may persistently store data in one or more storage devices. For example, a server may store a collection of data on a local storage array, and may also store a backup copy of the collection of data in a remote backup device. In some examples, the backup copy may be stored in a different form than the collection of data. For example, the backup copy may comprise a deduplicated representation of the collection of data. As used herein, a "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof. As used herein, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a collection of data may be stored on a block-based storage system. As used herein, a "block-based" storage system may refer to a system that stores data in the form of data blocks (also referred to herein as "block level"). In some examples, a block level may be a level at which a block-based storage device (e.g., a hard disk drive (HDD), solid state drive (SSD), or the like) or a virtual volume may store data thereon. The block-based storage device may receive the data blocks making up a collection of data as a stream of data blocks.

In some examples, a journal log may provide continuous data protection (CDP) for a storage system. The journal log may be implemented as a linked sequence of segments, with each segment including multiple entries that store copies or details of block level writes performed on the storage system. For example, each entry may record the data blocks that were written to a storage volume, and the storage address(es) that the data blocks were written to (e.g., an offset and length in the storage volume). As such, the journal log may form a historical record of all data written to the storage system. Further, the journal log may include data markers (referred to herein as "checkpoints") that indicate or represent various points in time. In the event that the stored data becomes corrupted (e.g., by a malware attack), the entries of the journal log may be read and then used to reconstruct the stored data as it existed at a point in time represented by a checkpoint. However, as the number of writes increases over time, the number of entries in the journal log also increases. As such, the size of the journal log may also increase over time, and may fill the space that is available to store the journal log. Accordingly, the amount of data that can be protected by the journal log may be limited by the maximum storage space that is available for the journal log.

In accordance with some implementations of the present disclosure, a controller may perform an operation to reduce the size of a journal log. The journal reduction operation may include identifying suitable target segments in the journal log. For example, the target segments may be identified based on age (e.g., not too old and too new), checkpoint duration (e.g., not too short or too long), and so forth. The journal reduction operation may also include determining a set of storage locations that were modified by the write operations recorded in the target segments, and identifying the most recent write operation for each modified storage location. Further, the journal reduction operation may include identifying a subset of journal entries in the target segments that record the identified most recent write operations, and then generating a new segment that includes only the identified subset of journal entries. The generated new segment may then replace the target segments in the journal log. In this manner, the journal entries that record superseded writes (i.e., a write that is performed for a given location, and is superseded by a later write for the same location) may be deleted from the journal log. Accordingly, the size of the journal log may be reduced without the loss of useful information. Furthermore, in some implementations, generating the new segment may include ordering the subset of journal entries according to storage address (i.e., in the order of the storage locations that were changed by the writes recorded in the journal entries). Accordingly, if the new segment is used to restore or recover the original data, the entries in the segment may be read and written according the address order of the storage volume. In this manner, the journal reduction operation may provide faster restoration or recovery of original data. Various aspects of the disclosed technique are discussed further below with reference to FIGS. 1-9.

FIG. 1—Example Storage System

FIG. 1 shows an example storage system 100 including a computing device 110 and a storage device 140, in accordance with some implementations. The computing device 110 may include a storage engine 120 to generate and/or transmit write operations to the storage device 140. For example, the storage engine 120 may receive an input data stream ("Input"), and in response may send a block based write to the storage device 140. The input may specify a filesystem operation (e.g., adding a new file, deleting an existing directory, moving an existing file, etc.). The write operation may cause stored data 125 (e.g., data and/or metadata blocks) to be written to a specified address or location in a particular volume 145 of the storage device 140.

In some implementations, the journal log engine 130 may generate or update a journal log 135, and may store some or all of the journal log 135 in the storage device 140. The journal log 135 may include multiple segments 137. Each segment 137 may store a specified size or number of journal entries. In some implementations, each journal entry may record information regarding a different write operation performed by the storage engine 120. For example, each entry of the journal log 135 may record the data blocks that were written in the operation, and the storage address(es) that the data blocks were written to (e.g., offset and length in storage volume 145). In some implementations, the journal log 135 may be implemented as a linked sequence of segments, with each segment including multiple entries. Further, the journal log 135 may include checkpoints to indicate various points in time. An example process for generating the journal log 135 is described below with reference to FIGS. 2, 3A-3D, and 4A-4B.

In some implementations, when some entries of the journal log 135 reach a maximum age, those entries may be removed from the journal log 135. Further, the removed entries may be used to generate a mirror volume 155. The mirror volume 155 may be a copy of the storage volume 145 as it existed at the time that those removed entries were added to the journal log 135. For example, the writes recorded in the removed entries may be applied (e.g., executed) in their recorded order to the mirror volume 155.

In some implementations, the journal log 135 may be used to reconstruct the storage volume 145 as it existed at a point in time represented by a checkpoint. For example, in the event that the storage volume 145 becomes corrupted or lost (e.g., due to device failure or a malware attack), the writes recorded in the journal entries preceding a particular checkpoint may be executed in their recorded order to reconstruct the storage volume 145 as it existed at the time represented by that particular checkpoint. In some examples, such a reconstruction operation may include executing the preceding writes (e.g., recorded in the journal entries preceding the particular checkpoint) against the mirror volume 155.

In some implementations, the journal log engine 130 may perform an operation to reduce the size of the journal log 135. For example, the journal log engine 130 may identify target segments 137 in the journal log 135, and may identify locations in the storage volume 145 that were modified by the write operations recorded in the target segments. Further, the journal log engine 130 may determine the most recent write operation for each modified location, and may identify a subset of journal entries in the target segments 137 that record the identified most recent write operations. The journal log engine 130 may then generate a new segment 137 that includes only the identified subset of journal entries, and may insert the new segment 137 in the journal log to replace the target segments 137. In this manner, the journal log engine 130 may delete the journal entries that record superseded writes, thereby reducing the size of the journal log 135 without the loss of useful information. An example process for reducing the size of the journal log 135 is described below with reference to FIGS. 5 and 6A-6C.

In some implementations, the journal log engine 130 may order the journal entries in the new segment 137 according to storage address. Accordingly, if the new segment 137 is used to restore or recover the original data, the entries in the new segment 137 may be read and written according the address order of the storage volume 145. In this manner, the journal reduction operation may provide faster restoration or recovery of original data.

In some implementations, the storage engine 120 and/or the journal log engine 130 may be implemented via hardware (e.g., electronic circuitry) or a combination of hardware and programming (e.g., comprising at least one processor and instructions executable by the at least one processor). In implementations using executable instructions, such instructions may be stored in machine-readable storage media (e.g., storage device 140), in hardware (e.g., circuitry), and so forth. The storage device 140 may include one or more non-transitory storage media such as hard disk drives (HDDs), solid state drives (SSDs), optical disks, and so forth, or a combination thereof. Further, in some implementations, the storage device 140 may include one or more block based storage devices.

In some implementations, the computing device 110 may be a physical computing device (e.g., server, appliance, desktop, etc.). For example, the computing device 110 may include a controller, memory, and persistent storage (not shown in FIG. 1). The controller may be implemented via hardware (e.g., electronic circuitry) or a combination of hardware and programming (e.g., comprising at least one processor and instructions executable by the at least one processor and stored on at least one machine-readable storage medium). The memory may be implemented in semiconductor memory such as random access memory (RAM). The persistent storage may include one or more non-transitory storage media such as hard disk drives (HDDs), solid state drives (SSDs), optical disks, and so forth, or a combination thereof. In other implementations, the computing device 110 may be one or more virtual computing devices (e.g., virtual machines, containers, etc.). For example, the storage engine 120 may be be implemented in a first virtual machine, and the journal log engine 130 may be implemented in a second virtual machine. Further, in such an example, the first virtual machine may include the volume 145, and the second virtual machine may include the journal log 135.

Note that, while FIG. 1 shows one example, implementations are not limited in this regard. For example, it is contemplated that the storage system 100 may include any number of computing devices 110 and/or storage devices 140. In another example, it is contemplated that the functionality of the storage engine 120 and/or the journal log engine 130 may be included in a single engine or software, in any another engine or software of storage system 100, in an external system or device (not shown in FIG. 1), in separate virtual computing devices, in a single virtual computing device, or any combination thereof. Further, it is contemplated that the storage system 100 may include additional devices and/or components, fewer components, different components, different arrangements, and so forth. Other combinations and/or variations are also possible.

Figure 2:
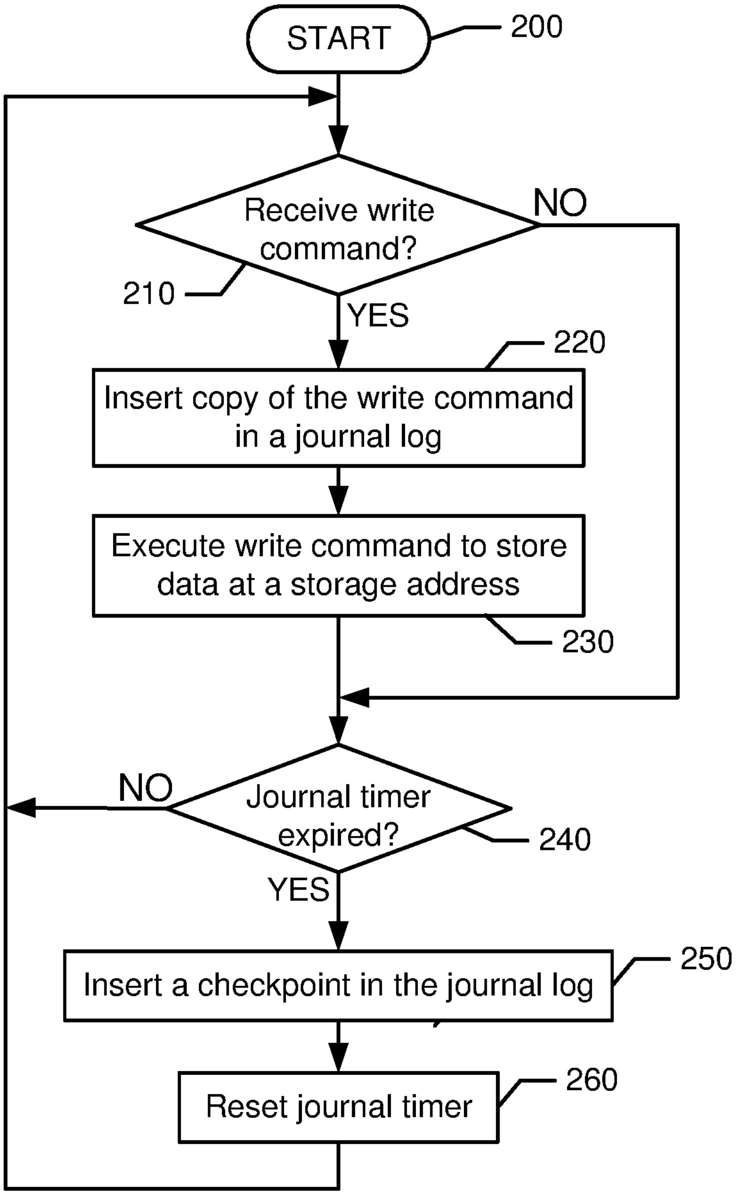
FIG. 2 is an illustration of an example process, in accordance with some implementations.

FIGS. 2, 3A-3D, and 4A-4B—Example Process for Generating a Journal Log FIG. 2 shows an example process 200 for generating a journal log, in accordance with some implementations. In some examples, the process 200 may be performed by some or all of the storage system 100 (shown in FIG. 1). The process 200 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 200 may be described below with reference to FIGS. 3A-3D and 4A-4B, which show some example implementations. However, other implementations are also possible.

The process 200 may begin at decision block 210, which may include determining whether a write command has been received. Upon a positive determination ("YES"), the process 200 may continue at block 220, including inserting a copy of the write command into a journal log. Block 230 may include executing the write command to store data at a storage address. After block 230, or after a negative determination at decision block 210 ("NO"), the process 200 may continue at decision block 240, including determining whether a journal timer has expired. If it is determined at decision block 240 that the journal timer has not expired ("NO"), the process 200 may return to decision block 210 (i.e., to again determine whether a write command has been received).

Figure 3A:
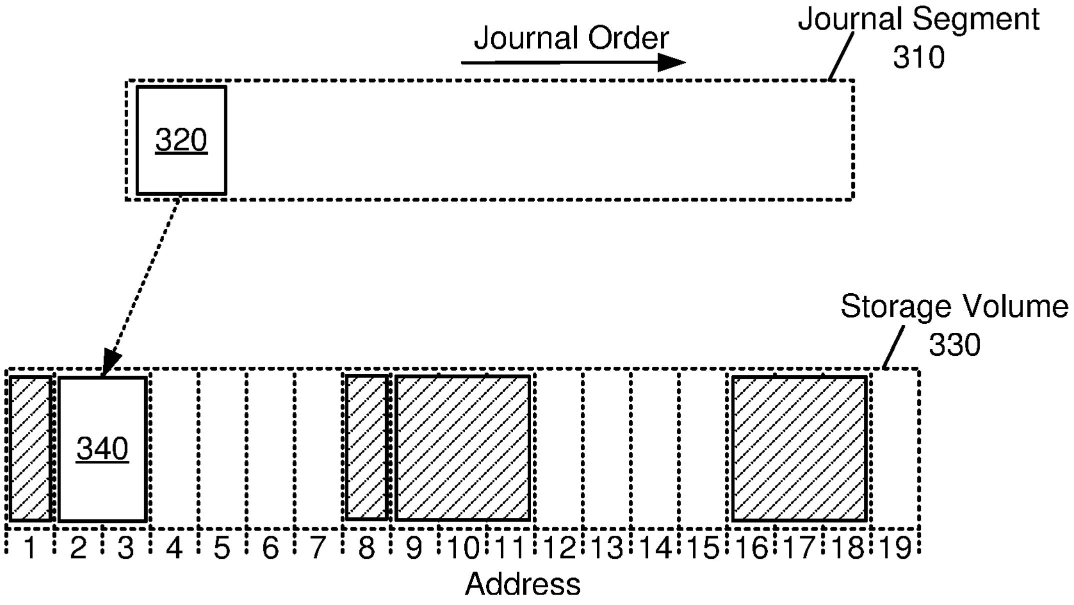
FIGS. 3A-3D are illustrations of example operations, in accordance with some implementations.

For example, referring to FIG. 3A, a controller (e.g., processing engine(s) included in computing device 110 shown in FIG. 1) receives a first command to perform data write 340 (e.g., writing a set of data block(s)) to address locations [2:3] in the storage volume 330. The controller executes the first command to perform the data write 340 to address locations [2:3]. Further, the controller creates a first entry 320 in a journal segment 310 (e.g., a portion of a journal log) to store information about data write 340. For example, the first entry 320 may include a copy of the data blocks that were written, the write location (i.e., address locations [2:3]), and any other information regarding data write 340.

Figure 3B:
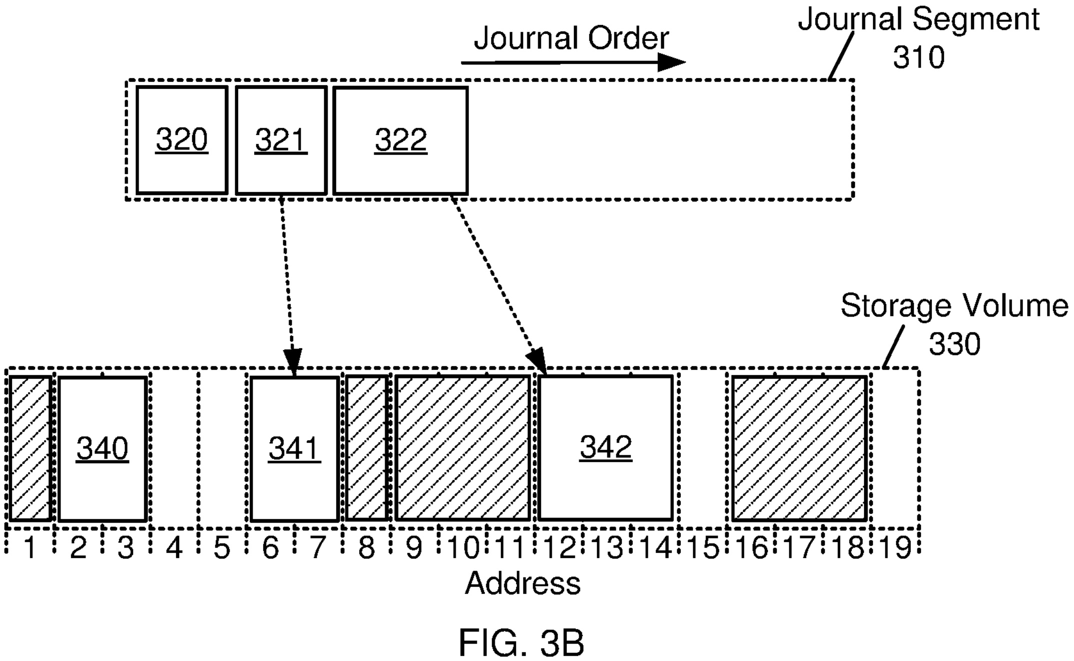

Referring now to FIG. 3B, the controller executes a second command to perform data write 341 to address locations [6:7], and also creates a second entry 321 in the journal segment 310 to store information about data write 341. Further, the controller executes a third command to perform a data write 342 to address locations [12:14], and also creates a third entry 322 in the journal segment 310 to store information about data write 342. In some implementations, each new entry is added to the journal segment 310 in order of receipt (i.e., the order that the write commands represented by the entries were received).

Figure 3C:
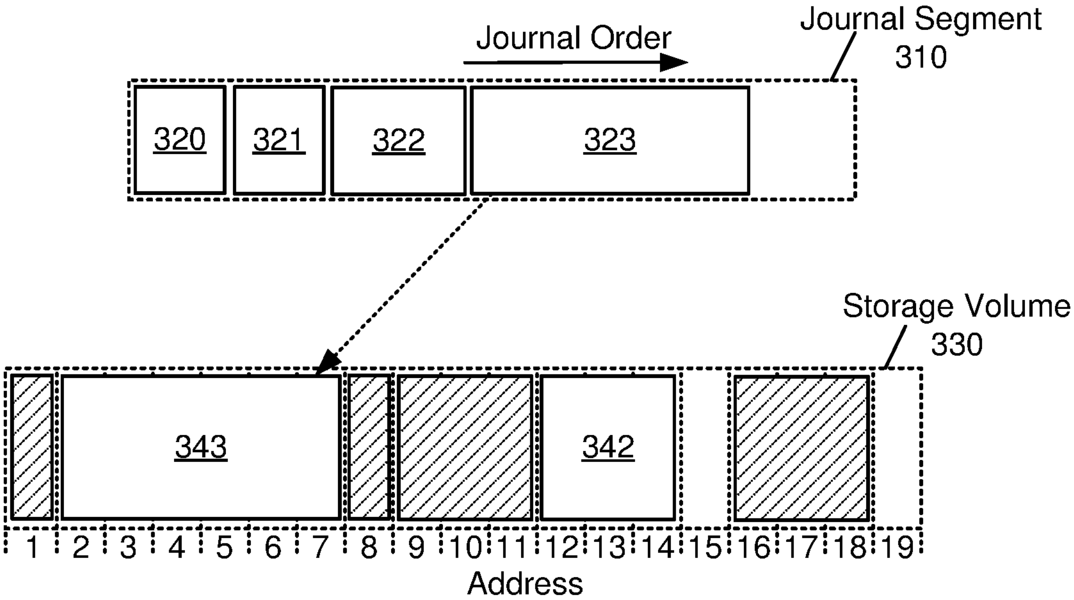

Referring now to FIG. 3C, the controller executes a fourth command to perform a data write 343 to address locations [2:7], and also creates a fourth entry 323 in the journal segment 310 to store information about data write 343. As shown in FIG. 3C, the data write 343 supersedes (i.e., overwrites) the data write 340 and the data write 341.

Figure 3D:
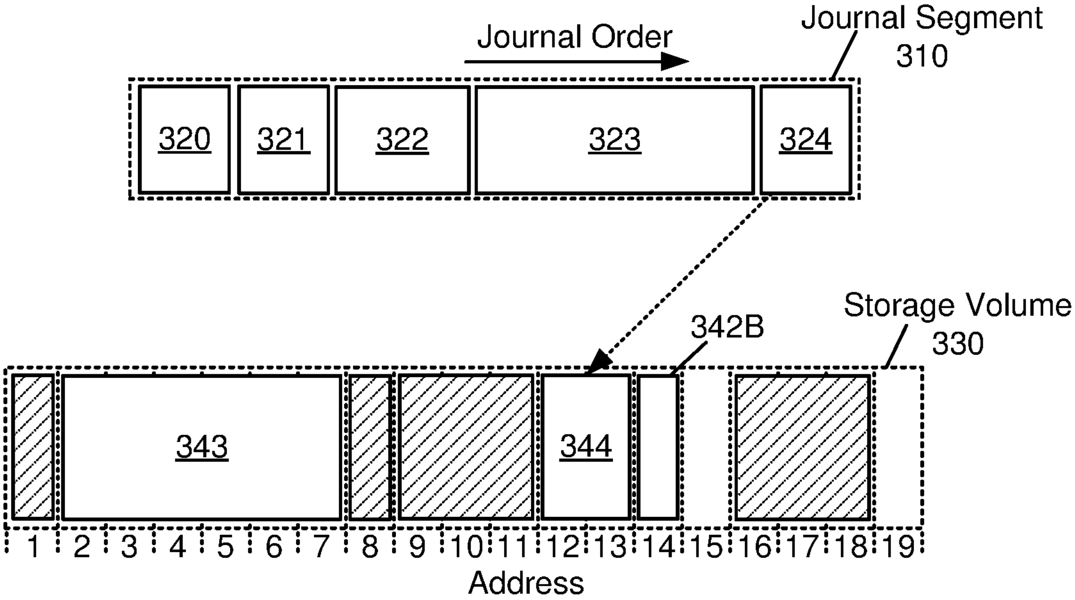

Referring now to FIG. 3D, the controller executes a fifth command to perform data write 344 to address locations [12:13], and also creates a fifth entry 324 in the journal segment 310 to store information about the data write 344. As shown in FIG. 3D, the data write 344 overwrites the portion of data write 342 that occupies address locations [12:13]. However, a partial data write 342B (i.e., the portion of data write 342 that was not overwritten by data write 344) remains in address location [14]. Further, the controller may determine that the journal segment 310 has been filled (i.e., by storing entries 320-324) to a maximum size, and in response may initiate a new journal segment (not shown in FIG. 3D) to store any additional journal entries (i.e., to record information about subsequent write commands).

Referring again to FIG. 2, if it is determined at decision block 240 that the journal timer has expired ("YES"), the process 200 may continue at block 250, including inserting a checkpoint into the journal log. Further, block 260 may include resetting the journal timer. After block 260, the process 200 may return to decision block 210 (i.e., to again determine whether a write command has been received). In some implementations, the journal timer may be a cyclical timer that indicates (i.e., upon expiring) a desired time period between checkpoints in the journal log (e.g., two second, five seconds, and so forth).

Figure 4A:
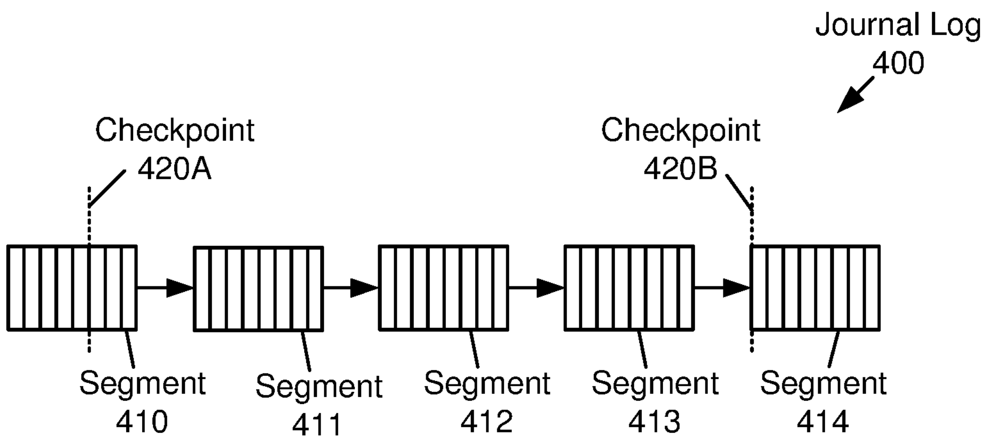
FIGS. 4A-4B are illustrations of example data structures, in accordance with some implementations.

For example, referring to FIG. 4A, the controller generates a journal log 400 as a linked chain of journal segments 410, 411, 412, 413, 414. Each journal segment may store a specified size or number of journal entries. Further, each journal segment may include link(s) to its immediate neighbor(s) in the chain. For example, the segment 411 may include a first link to the preceding segment 410, and a second link to the following segment 412. As shown in FIG. 4A, the segment 410 may include a first checkpoint 420A that was created at a first point in time. When the journal timer expires, the controller may determine that the elapsed time since the creation of the first checkpoint 420A has reached a desired time spacing between checkpoints. Accordingly, the controller generates a second checkpoint 420B in response to the expiration of the journal timer.

Figure 4B:
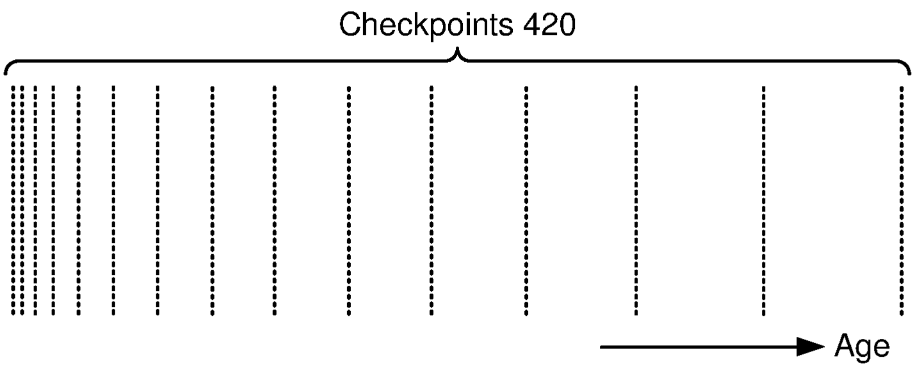

Referring now to FIG. 4B, in some implementations, the spacing between the checkpoints 420 in a journal may be increased as those checkpoints become older. For example, a controller may delete a specified number or proportion of checkpoints 420 of a particular age (e.g., delete 40% of the checkpoints 420 that are one day old, delete 50% of the remaining checkpoints 420 that are two days old, and so forth). In this manner, the time period represented between two sequential checkpoints may be gradually increased as those checkpoints increase in age.

FIGS. 5 and 6A-6C—Example Process for Reducing a Journal Log

Figure 5:
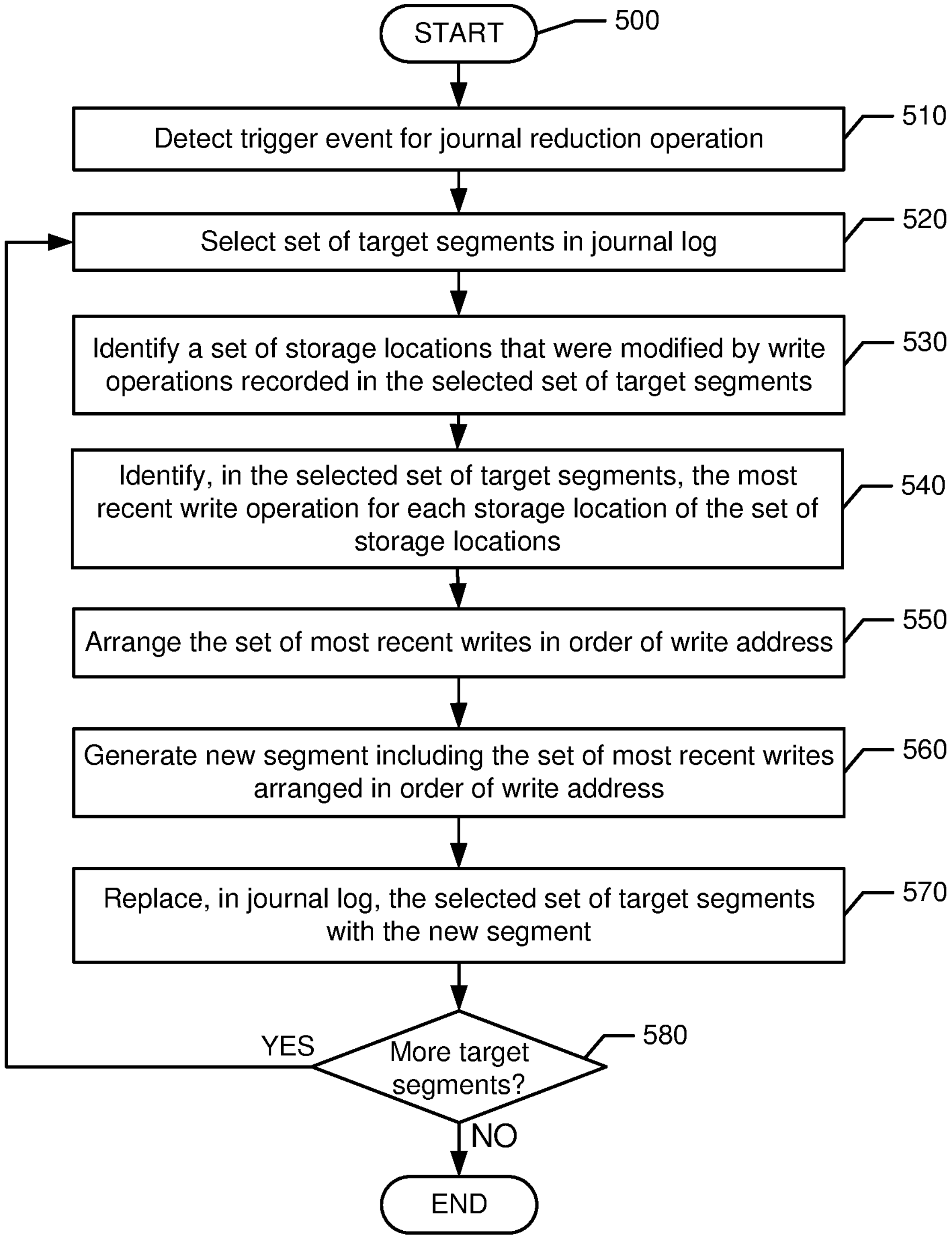
FIG. 5 is an illustration of an example process, in accordance with some implementations.

FIG. 5 shows an example process 500 for reducing a journal log, in accordance with some implementations. In some examples, the process 500 may be performed by some or all of the storage system 100 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 may be described below with reference to FIGS. 6A-6C, which show some example implementations. However, other implementations are also possible.

The process 500 may begin at block 510, including detecting a trigger event for journal reduction operation. For example, referring to FIG. 1, the journal log engine 130 detects a condition or event that triggers the performance of a reduction operation for the journal log 135. In a first example, the trigger event may be a determination that a system workload (e.g., the current workload of the storage system 100) is below a specified threshold, thereby indicating that a storage system has available processing bandwidth to perform the reduction operation. In a second example, the trigger event may be a determination that the current size of the journal log 135 has exceeded a maximum storage allocation. Further, in other examples, the trigger event may be a user command to initiate the reduction operation, a scheduled initiation of the reduction operation, the expiration of a periodic timer, and so forth. Other examples or combinations of trigger events are possible.

Referring again to FIG. 5, block 520 may include selecting a set of target segments in journal log. For example, referring to FIG. 1, the journal log engine 130 may analyze the journal log 135 to identify a subset of the segments 137 (referred to herein as "target segments") that are suitable candidates for a reduction operation. In some examples, the target segments 137 may conform to a specified age range (e.g., segments that are older than a minimum age and/or are newer that a maximum age). In another example, the target segments may be located between two checkpoints that are separated by a specified spacing range (e.g., located between two consecutive checkpoints that are separated by more than a minimum temporal spacing and/or less than a maximum temporal spacing). In yet another example, the target segments may include entries representing at least a minimum amount of overwriting operations (e.g., multiple writes to a single storage location). In still another example, the target segments may include all of the segments 137 included in the journal log 135. Other examples of target segments or combinations are possible.

Figure 6A:
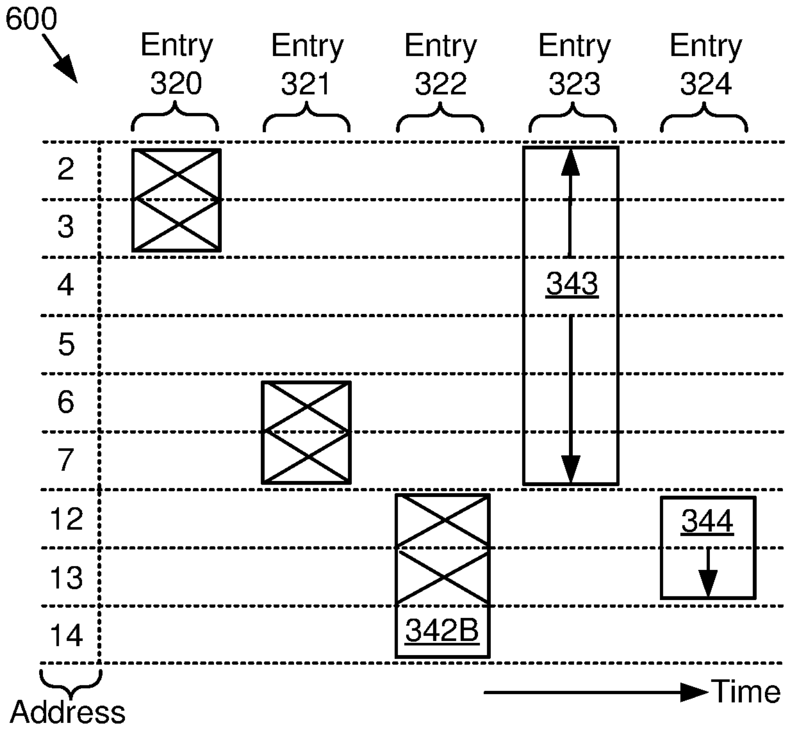
FIGS. 6A-6C are illustrations of example operations, in accordance with some implementations.
Figure 6B:
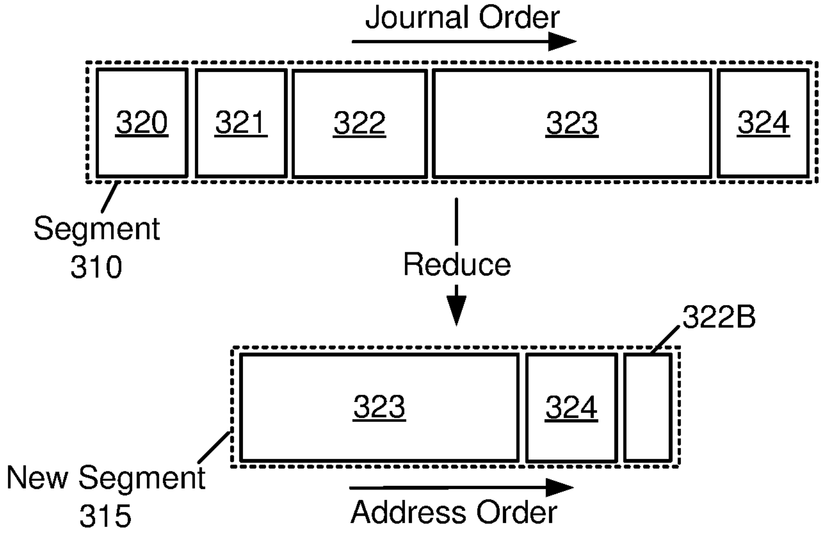
Figure 6C:
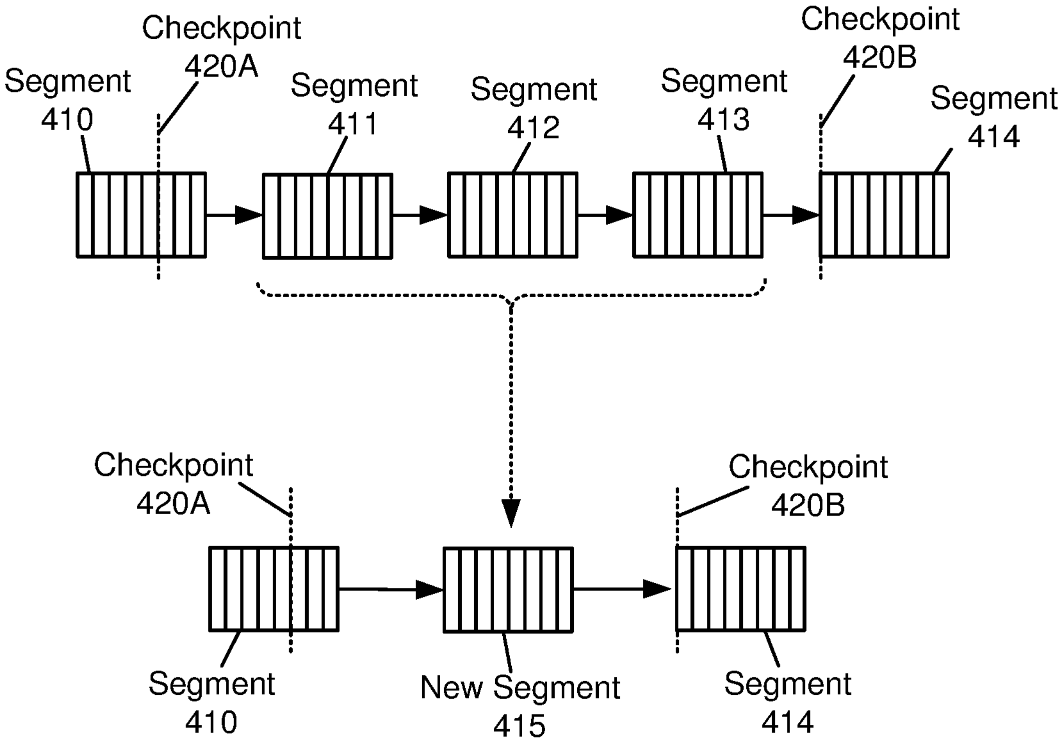

Referring again to FIG. 5, block 530 may include identifying a set of storage locations that were modified by write operations recorded in the selected set of target segments. Block 540 may include identifying, in the selected set of target segments, the most recent write operation for each storage location of the set of storage locations. For example, referring to FIG. 6A, shown is a graph 600 illustrating the data writes recorded in the journal segment 310 (discussed above with reference to FIGS. 3A-3D). The graph 600 may illustrate aspects of blocks 530 and 540 as executed by a processing engine (e.g., journal log engine 130 shown in FIG. 1). As shown in FIG. 6A, the graph 600 illustrates that data write 343 (recorded in entry 323) is the most recent write to address locations [2:7], that data write 344 (recorded in entry 324) is the most recent write to address locations [12:13], and that partial data write 342B (recorded in entry 322) is the most recent write to address location [14]. Note that data writes 340 and 341 (recorded in entries 320 and 321) have been superseded (i.e., overwritten) by data write 343 (recorded in entry 323). Note also that, while FIG. 6A shows an illustrative example in which the most recent data writes are identified within a single journal segment 310, implementations are not limited in this regard. Instead, it is contemplated that identifying the most recent data writes (i.e., during blocks 530 and 540) may be performed across a set of multiple target segments.

Referring again to FIG. 5, block 550 may include arranging the set of most recent writes in order of write address. Block 560 may include generating a new segment including the set of most recent writes arranged in order of write address. For example, referring to FIG. 6B, the processing engine determines that the set of most recent writes in the current target segments are data writes 343, 344, and 342B. Further, the processing engine determines that the journal log information for the set of most recent data writes is stored in the entry 323 (recording data write 343), the entry 324 (recording data write 344), and a partial entry 322B (recording partial data write 322B). Furthermore, the processing engine sorts the entries for the most recent writes (e.g., entry 323, entry 324, and partial entry 322B) according to the address order of the most recent writes, and then generates a new segment 315 that includes only these sorted entries.

Referring again to FIG. 5, block 570 may include replacing, in journal log, the selected set of target segments with the new segment. Decision block 580 may include determining whether there are more target segments to be reduced in the journal log. Upon a positive determination ("YES"), the process 500 may return to 520 (i.e., to select another set of target segments in the journal log). Otherwise, upon negative determination at decision block 580 ("NO"), the process 500 may be completed. For example, referring to FIG. 6C, the processing engine replaces a set of multiple target segments 411, 412, 413 with a new segment 415. In some examples, the processing engine generates links between a preceding segment 410 and the new segment 415, and between the new segment 415 and a following segment 414. In this manner, a journal log may be reduced in size, and may continue to be used as a linked chain of segments.

In some implementations, the reduced journal log may be used to reconstruct a storage volume or device as it existed at a point in time represented by checkpoint 420B. For example, in the event that a storage volume becomes corrupted or lost, the writes recorded in the new segment 415 may be executed to reconstruct the storage volume as it existed at the time represented by checkpoint 420B. In some implementations, the entries in the new segment 415 are arranged in order of write address, and therefore the same entries are read and executed in the same order in which they are written to restore the storage volume. In this manner, the journal log including reduced portions or segments (e.g., new segment 415) may provide faster restoration or recovery of the data in the storage volume.

In some implementations, older entries may be removed from the journal log (e.g., upon reaching a maximum age), and the writes recorded in the removed entries may be executed to generate a mirror volume (e.g., mirror volume 155 shown in FIG. 1). The mirror volume may represent the storage volume as it existed at the time that those removed entries were added to the journal log. In some implementations, any removed entries that are included in a reduced segment (e.g., new segment 415) are arranged in order of write address, and therefore such removed entries are read and executed in the same order in which they are written to generate the mirror volume. In this manner, the journal log including reduced segments may provide faster generation of the mirror volume.

Figure 7:
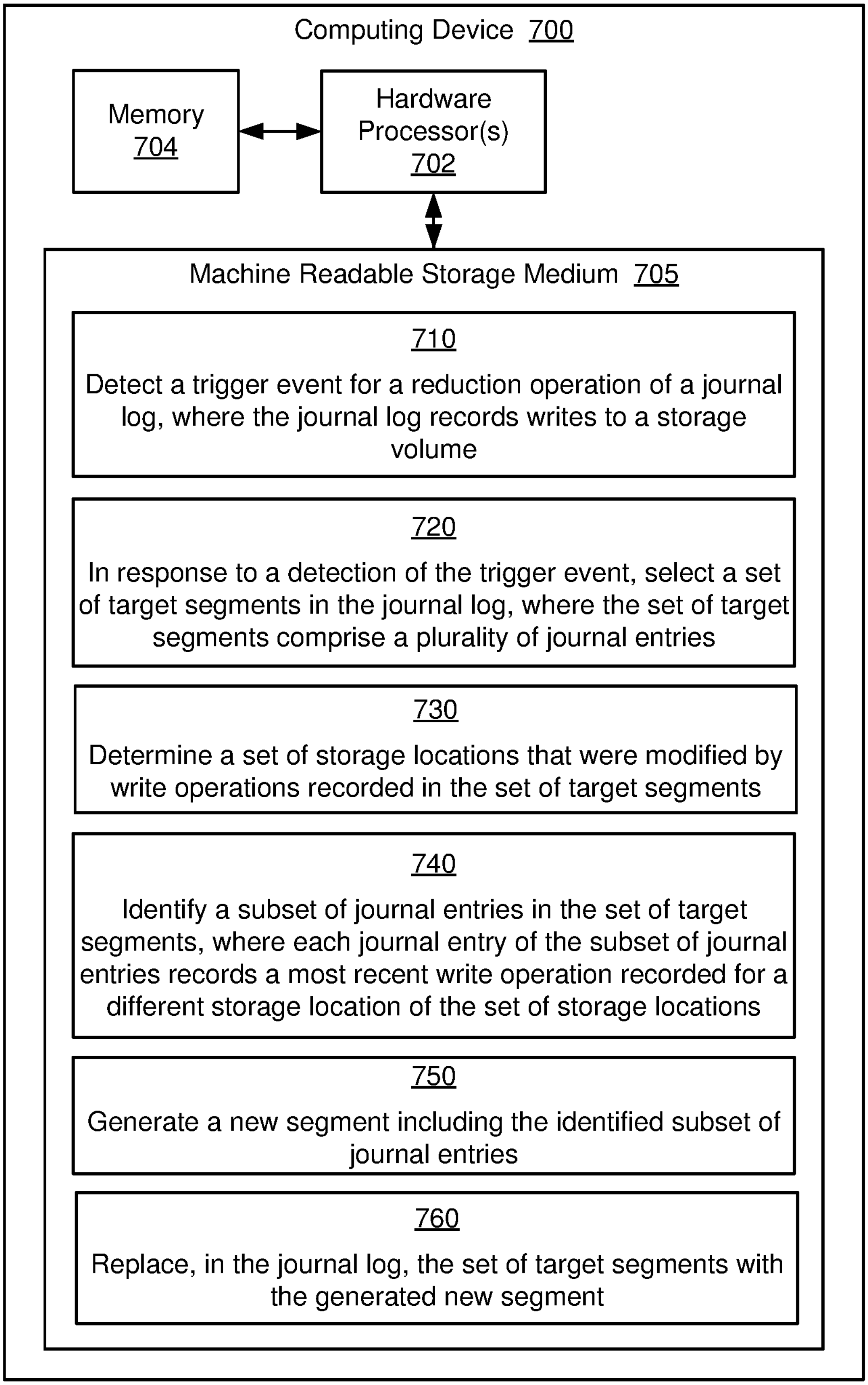
FIG. 7 is a schematic diagram of an example computing device, in accordance with some implementations.

FIG. 7—Example Computing Device

FIG. 7 shows a schematic diagram of an example computing device 700. In some examples, the computing device 700 may correspond generally to some or all of the computing device 110 (shown in FIG. 1A), which may be separate from the storage device 140. As shown, the computing device 700 may include hardware processor 702 and machine-readable storage 705 including instruction 710-760. The machine-readable storage 705 may be a non-transitory medium. The instructions 710-760 may be executed by the hardware processor 702, or by a processing engine included in hardware processor 702.

Instruction 710 may be executed to detect a trigger event for a reduction operation of a journal log, where the journal log records writes to a storage volume. For example, referring to FIG. 1, the journal log engine 130 detects a condition or event that triggers the performance of a reduction operation for the journal log 135. The trigger event may be based on a workload of the system 100, a size of the journal log 135, a user command, a schedule, a periodic timer, and so forth.

Instruction 720 may be executed to, in response to a detection of the trigger event, select a set of target segments in the journal log, where the set of target segments comprise a plurality of journal entries. For example, referring to FIG. 1, the journal log engine 130 may identify a set of target segments from among the segments 137 of the journal log 135. The target segments may be selected based on segment age, temporal spacing, overwriting amount, and so forth.

Instruction 730 may be executed to determine a set of storage locations that were modified by write operations recorded in the set of target segments. Instruction 740 may be executed to identify a subset of journal entries in the set of target segments, where each journal entry of the subset of journal entries records a most recent write operation recorded for a different storage location of the set of storage locations. For example, referring to FIG. 6A, a controller determines that data write 343 is the most recent write to address locations [2:7], that data write 344 is the most recent write to address locations [12:13], and that partial data write 342B is the most recent write to address location [14]. In some implementations, the controller may read a stored data structure that records the most recent write operation for each address location in a storage volume(s).

Instruction 750 may be executed to generate a new segment including the identified subset of journal entries. For example, referring to FIG. 6B, a controller sorts the journal entries for the most recent writes (e.g., entry 323, entry 324, and partial entry 322B) according to the address order of the most recent writes, and then generates a new segment 315 that includes only these sorted entries.

Instruction 760 may be executed to replace, in the journal log, the set of target segments with the generated new segment. For example, referring to FIG. 6C, a controller replaces the target segments 411, 412, 413 with a new segment 415. In some examples, the controller generates links between a preceding segment 410 and the new segment 415, and between the new segment 415 and a following segment 414.

Figure 8:
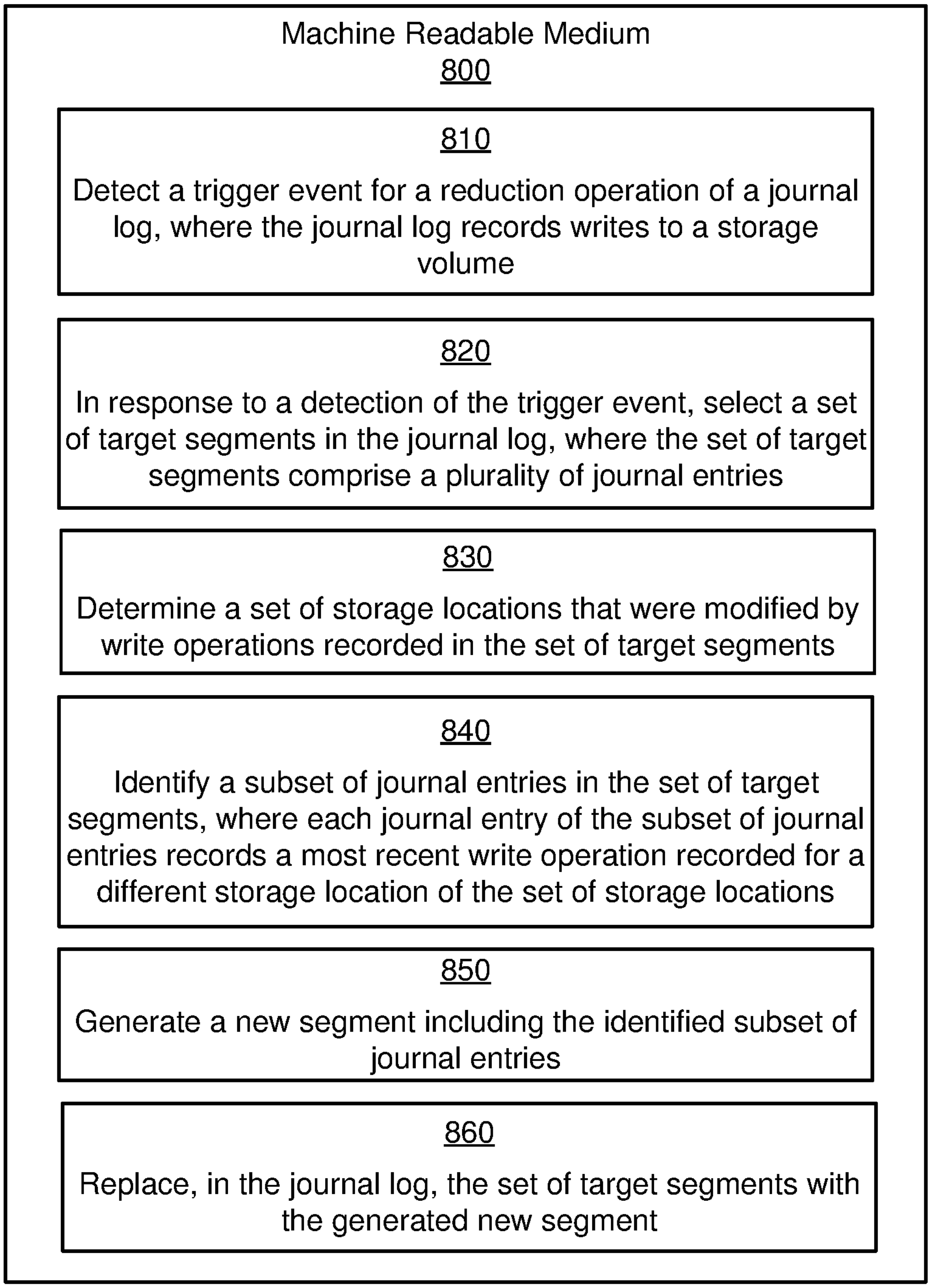
FIG. 8 is a diagram of an example machine-readable medium storing instructions in accordance with some implementations.

FIG. 8—Example Machine-Readable Medium

FIG. 8 shows a machine-readable medium 800 storing instructions 810-860, in accordance with some implementations. The instructions 810-860 can be executed by a single processor, multiple processors, a single processing engine, multiple processing engines, and so forth, which may be separate from a storage device. The machine-readable medium 800 may be a non-transitory storage medium, such as an optical, semiconductor, or magnetic storage medium.

Instruction 810 may be executed to detect a trigger event for a reduction operation of a journal log, where the journal log records writes to a storage volume. Instruction 820 may be executed to, in response to a detection of the trigger event, select a set of target segments in the journal log, where the set of target segments comprise a plurality of journal entries. Instruction 830 may be executed to determine a set of storage locations that were modified by write operations recorded in the set of target segments.

Instruction 840 may be executed to identify a subset of journal entries in the set of target segments, where each journal entry of the subset of journal entries records a most recent write operation recorded for a different storage location of the set of storage locations. Instruction 850 may be executed to generate a new segment including the identified subset of journal entries, Instruction 860 may be executed to replace, in the journal log, the set of target segments with the generated new segment.

Figure 9:
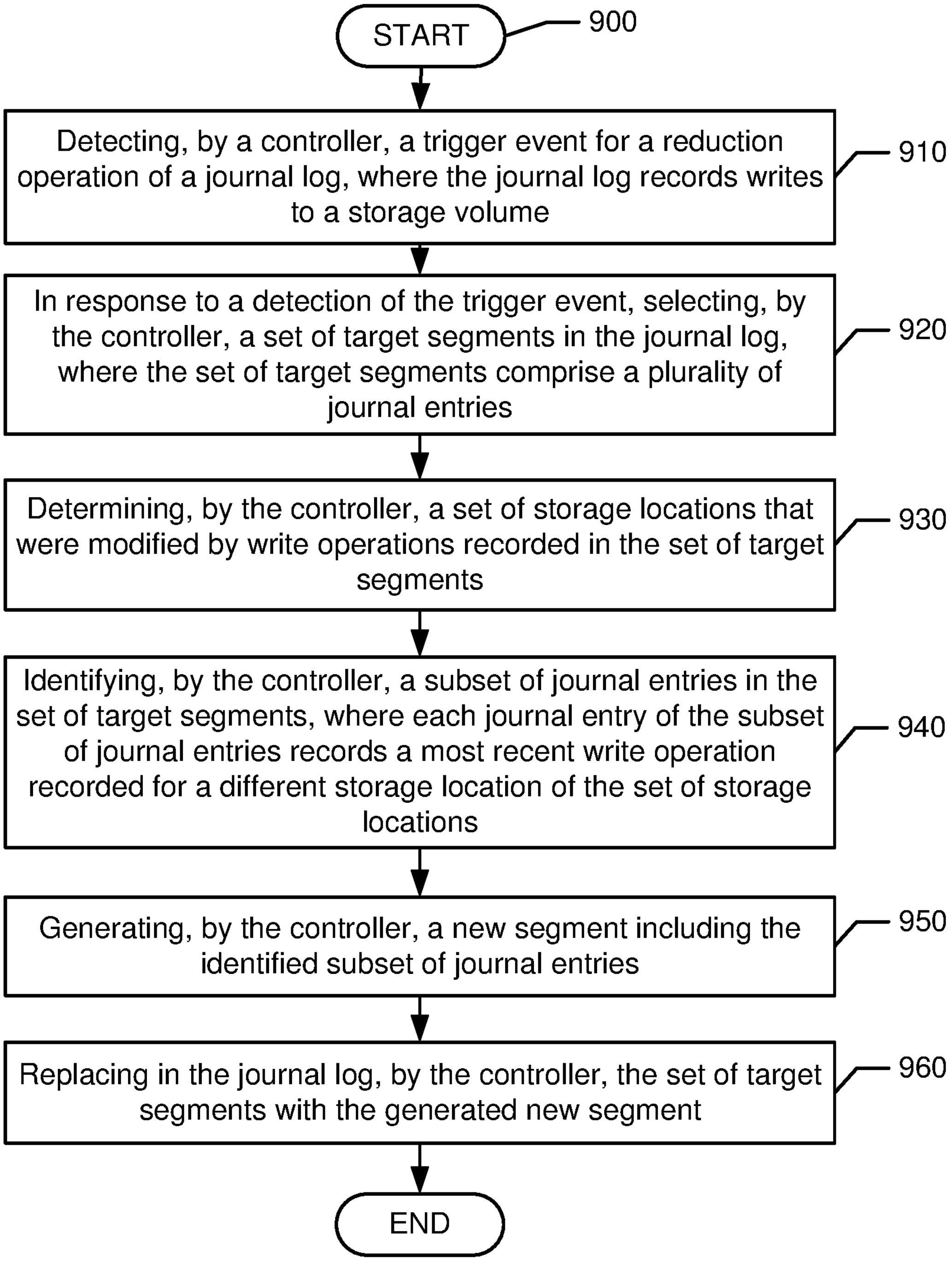
FIG. 9 is an illustration of an example process, in accordance with some implementations.

FIG. 9—Example Process for Reducing a Journal Log

FIG. 9 shows an example process 900 for reducing a journal log, in accordance with some implementations. In some examples, the process 900 may be performed by some or all of the storage system 100 (shown in FIG. 1). The process 900 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 910 may include detecting, by a controller, a trigger event for a reduction operation of a journal log, where the journal log records writes to a storage volume. Block 920 may include, in response to a detection of the trigger event, selecting, by the controller, a set of target segments in the journal log, where the set of target segments comprise a plurality of journal entries. Block 930 may include determining, by the controller, a set of storage locations that were modified by write operations recorded in the set of target segments.

Block 940 may include identifying, by the controller, a subset of journal entries in the set of target segments, where each journal entry of the subset of journal entries records a most recent write operation recorded for a different storage location of the set of storage locations. Block 950 may include generating, by the controller, a new segment including the identified subset of journal entries. Block 960 may include replacing in the journal log, by the controller, the set of target segments with the generated new segment.

In accordance with some implementations described herein, a controller may perform an operation to reduce the size of a journal log. The journal reduction operation may include identifying suitable target segments in the journal log, determining a set of storage locations that were modified by the write operations recorded in the target segments, and identifying the most recent write operation for each modified storage location. Further, the journal reduction operation may include identifying a subset of journal entries in the target segments that record the identified most recent write operations, generating a new segment that includes only the identified subset of journal entries, and replacing the target segments with the new segment. In this manner, the journal entries that record superseded writes may be deleted from the journal log, thereby reducing the size of the journal log may be reduced without the loss of useful information. Further, in some implementations, the subset of journal entries may be reordered according to storage address in the new segment. Accordingly, if the new segment is used to restore or recover the original data, the entries in the segment may be read and written according the address order of the storage volume. In this manner, the journal reduction operation may provide faster restoration or recovery of original data.

Note that, while FIGS. 1-9 show various examples, implementations are not limited in this regard. For example, referring to FIG. 1, it is contemplated that the system 100 may include additional devices and/or components, fewer components, different components, different arrangements, and so forth. In another example, it is contemplated that the functionality of the journal log engine 130 described above may be included in any another engine or software of the system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing system comprising:

a processor; and a machine-readable storage storing instructions, the instructions executable by the processor to:

detect a trigger event for a reduction operation of a journal log, wherein the journal log records writes to a storage volume;

in response to a detection of the trigger event, select a set of target segments in the journal log, wherein the set of target segments comprise a plurality of journal entries;

determine a set of storage locations that were modified by write operations recorded in the plurality of journal entries of the set of target segments;

identify a first subset of journal entries in the set of target segments, wherein each journal entry of the first subset of journal entries records a most recent write operation performed to a different storage location of the set of storage locations, wherein each journal entry of the first subset of journal entries records a set of data blocks written to the different storage location of the set of storage locations, and wherein the set of target segments includes a second subset of journal entries that are excluded from the first subset of journal entries;

generate a new segment that includes the first subset of journal entries and excludes the second subset of journal entries of the set of target segments; and replace, in the journal log, the set of target segments with the generated new segment that includes the first subset of journal entries and excludes the second subset of journal entries of the set of target segments.

2. The computing system of claim 1, including instructions executable by the processor to:

determine a stored order of the set of storage locations; and arrange, in the new segment, the identified first subset of journal entries based on the stored order of the set of storage locations.

3. The computing system of claim 1, wherein the set of target segments is located between two checkpoints of the journal log.

4. The computing system of claim 3, including instructions executable by the processor to:

select the set of target segments in response to a determination that the two checkpoints are separated by more than a minimum temporal spacing and by less than a maximum temporal spacing.

5. The computing system of claim 1, including instructions executable by the processor to:

select the set of target segments in response to a determination that the set of target segments is older than a minimum age and is newer than a maximum age.

6. The computing system of claim 1, including instructions executable by the processor to:

select the set of target segments in response to a determination that the set of target segments include entries representing at least a minimum amount of overwriting operations.

7. The computing system of claim 1, wherein the trigger event is a determination that an available processing bandwidth of the computing device exceeds a threshold level.

8. The computing system of claim 1, wherein the trigger event is a determination that the journal log has been filled to a predefined level.

9. A non-transitory machine-readable medium storing instructions that upon execution cause a processor to:

detect a trigger event for a reduction operation of a journal log, wherein the journal log records writes to a storage volume;

in response to a detection of the trigger event, select a set of target segments in the journal log, wherein the set of target segments comprise a plurality of journal entries;

determine a set of storage locations that were modified by write operations recorded in the plurality of journal entries of the set of target segments;

identify a first subset of journal entries in the set of target segments, wherein each journal entry of the first subset of journal entries records a most recent write operation performed to a different storage location of the set of storage locations, wherein each journal entry of the first subset of journal entries records a set of data blocks written to the different storage location of the set of storage locations, and wherein the set of target segments includes a second subset of journal entries that are excluded from the first subset of journal entries;

generate a new segment that includes the first subset of journal entries and excludes the second subset of journal entries of the set of target segments; and replace, in the journal log, the set of target segments with the generated new segment that includes the first subset of journal entries and excludes the second subset of journal entries of the set of target segments.

10. The non-transitory machine-readable medium of claim 9, including instructions that upon execution cause the processor to:

determine a stored order of the set of storage locations; and arrange, in the new segment, the identified first subset of journal entries based on the stored order of the set of storage locations.

11. The non-transitory machine-readable medium of claim 9, including instructions that upon execution cause the processor to:

select the set of target segments in response to a determination that two checkpoints are separated by more than a minimum temporal spacing and by less than a maximum temporal spacing, wherein the set of target segments is located between the two checkpoints of the journal log.

12. The non-transitory machine-readable medium of claim 9, including instructions that upon execution cause the processor to:

select the set of target segments in response to a determination that the set of target segments is older than a minimum age and is newer than a maximum age.

13. The non-transitory machine-readable medium of claim 9, including instructions that upon execution cause the processor to:

select the set of target segments in response to a determination that the set of target segments include entries representing at least a minimum amount of overwriting operations.

14. The non-transitory machine-readable medium of claim 9, wherein the detection of the trigger event is based on at least one of a system workload, a size of the journal log, a user command, a scheduled event, and a periodic timer.

15. A method comprising:

detecting, by a controller, a trigger event for a reduction operation of a journal log, wherein the journal log records writes to a storage volume;

in response to a detection of the trigger event, selecting, by the controller, a set of target segments in the journal log, wherein the set of target segments comprise a plurality of journal entries;

determining, by the controller, a set of storage locations that were modified by write operations recorded in the plurality of journal entries of the set of target segments;

identifying, by the controller, a first subset of journal entries in the set of target segments, wherein each journal entry of the first subset of journal entries records a most recent write operation performed to a different storage location of the set of storage locations, wherein each journal entry of the first subset of journal entries records a set of data blocks written to the different storage location of the set of storage locations, and wherein the set of target segments includes a second subset of journal entries that are excluded from the first subset of journal entries;

generating, by the controller, a new segment that includes the first subset of journal entries and excludes the second subset of journal entries of the set of target segments; and replacing in the journal log, by the controller, the set of target segments with the generated new segment that includes the first subset of journal entries and excludes the second subset of journal entries of the set of target segments.

16. The method of claim 15, comprising:

determining a stored order of the set of storage locations; and arranging, in the new segment, the identified first subset of journal entries based on the stored order of the set of storage locations.

17. The method of claim 15, comprising:

selecting the set of target segments in response to a determination that two checkpoints are separated by more than a minimum temporal spacing and by less than a maximum temporal spacing, wherein the set of target segments is located between the two checkpoints of the journal log.

18. The method of claim 15, comprising:

selecting the set of target segments in response to a determination that the set of target segments is older than a minimum age and is newer than a maximum age.

19. The method of claim 15, comprising:

selecting the set of target segments in response to a determination that the set of target segments include entries representing at least a minimum amount of overwriting operations.

20. The method of claim 15, wherein the detection of the trigger event is based on at least one of a system workload, a size of the journal log, a user command, a scheduled event, and a periodic timer.

* * * * *